Patented Dec. 6, 1938

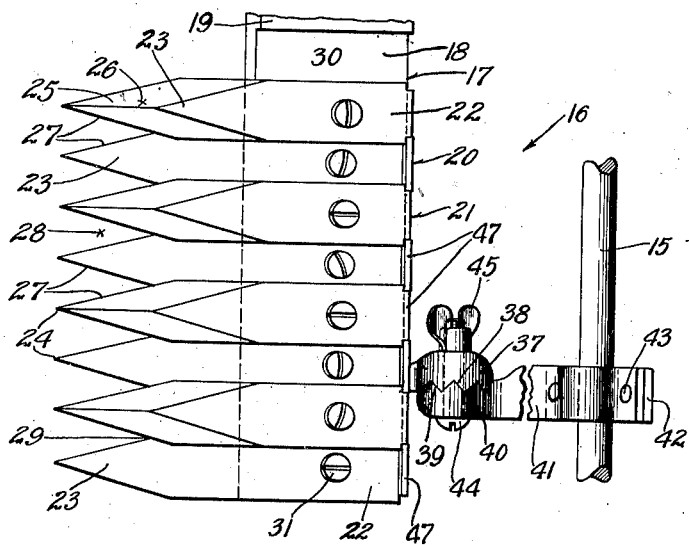

2,139,349

UNITED STATES PATENT OFFICE 2,139,349

STRAY GRASS CUTTER

Frederick W. Barker and Lester C. Barker, Pound Ridge, N. Y., assignors of one-third to Howard A. Ward, New Canaan, Conn.

Application May 29, 1937, Serial No. 145,456

15 Claims. (Cl. 56—238)

This invention relates to lawn mowers.

It is an object of the invention to provide a lawn mower that will operate in an improved manner to cut tall grass as well as short grass.

It is another object of the invention to provide a lawn mower that will serve to effectively cut weed stems, long blades of grass and the like which normally lean over and are not cut by the conventional lawn mower but snap into an upright position after the passage of the lawn mower, thus necessitating a separate hand snipping or cutting operation.

In achieving these objects there is provided as a feature of the invention a novel stray grass cutter having no moving parts, adapted to be positioned in front of a conventional lawn mower.

A further feature of the invention resides in so associating the stray grass cutter with a conventional lawn mower that it may be either raised or lowered relative to the ground and may also be positioned at divers inclinations relative thereto.

Hence, with the present invention the height of the stray grass cutter may be set so as to cut only the portions of the tall grass, weeds and the like which extend upwardly beyond the normal lawn growth, thus preparing the lawn in advance of the rotary cutter. Also the cutter may be set very close to the lawn to wedge cut the low lying weeds and the like which normally would not be trimmed by the rotary cutter.

Likewise, the inclination of the stray grass cutter may be varied to effectively wedge cut growth of different types and of different heights. With certain types of growth it is important that the inclination of the cutter be greater than with other types to prevent the tall grass, weeds and the like from being bent over and left uncut or unevenly cut by the stray grass cutter.

Another feature of the invention resides in providing in combination with a conventional rotating lawn mower, a stray grass cutter having no moving parts, which effectively cuts and prepares the lawn in advance of the rotary cutter.

The stray grass cutter which thus so effectively cuts and prepares the lawn for the immediately following action of the rotary cutter includes as an important feature thereof a novel carrier plate provided with forwardly extending channels and ribs which are adapted to respectively locate a series of upper and a series of lower cutter blades.

A supplemental feature of the invention resides in providing screw holes in the bottom of the channels and on the ribs in a straight line whereby cutter blades may be interchangeably used in either the upper or lower series.

Another feature of the invention resides in so positioning the respective upper and lower blades that the bevels of the cutting edges are opposed, and in offsetting the blades in the respective series in marginal overlapping relation so as to provide a series of V-shaped cutting wedges.

A further object of the invention is to so support the upper and lower blades that the cutting edges thereof engage in very tight contact at the points constituting the apexes of the forwardly facing cutting wedges.

In achieving this important object and thus materially increasing the efficiency of the cutter, channels in the carrier bar are formed with curved bottoms which cause the lower cutter blades to curve upwardly and to engage the flat supported upper cutter blades in very tight contact at the points constituting the apexes of the cutting wedges provided by the forwardly extending portions of the upper and lower cutter blades.

Other objects and features will hereinafter appear.

In the drawing:

Figure 1 is a fragmentary top view of the stray grass cutter forming the subject matter of the present invention.

Fig. 2 is a side view of the stray grass cutter illustrated in Fig. 1.

Fig. 3 is a perspective view of a portion of the carrier plate embodied in the cutter illustrated in Figs. 1 and 2.

Fig. 4 is a side view similar to Fig. 2 but illustrating a modified form of the stray grass cutter.

Fig. 5 is a perspective view similar to Fig. 3 but showing the carrier block used with the modified form illustrated in Fig. 4.

Fig. 6 is a fragmentary view showing the stray grass cutter in association with a conventional lawn mower.

Fig. 7 is a detail view of a slightly modified cutter blade.

Fig. 8 is a fragmentary perspective view showing the cooperation of the tongues of adjacent blades with each other and with the carrier plate.

Before describing the present improvements and mode of operation thereof in detail it should be understood that the invention is not limited to the details of construction and arrangement of parts shown in the accompanying drawing, which is merely illustrative of the present preferred embodiments, since the invention is capable of other embodiments, and the phraseology employed is for the purpose of description and not of limitation.

Referring now more particularly to the drawing which illustrates the present preferred embodiments of the invention, and first to Fig. 6, there is disclosed a portion of a conventional lawn mower 11 of the rotary type having a pair of spaced supporting wheels 12, only one being shown, between which is carried a rotary cutter 13 composed of a plurality of curved blades 14 adapted to successively cooperate with a fixed blade 46 to cut or shear grass and the like as the mower is moved over the lawn. As is also conventional a crossbar 15 is provided to rigidify and strengthen the lawn mower.

Such lawn mowers have been in successful and wide spread use for many years. Due to the fact that in operation, especially when cutting tall grass and the like, the rotary cutter tends to become clogged with both the cut and uncut material, lawn mowers of the conventional rotary type have been limited in their successful use to the cutting of relatively short grass. Moreover, such lawn mowers have a tendency to flatten or lay down instead of cut certain kinds of growth which snap into an upright position after the mower has passed thereover.

This fact has been recognized in certain prior developments in which a cutting instrumentality has been associated with the mower to prepare and cut the grass in advance of the conventional rotary cutter. However, such prior proposals were usually supplementary movable cutters, the operation of which imposed an added load upon the operating mechanism of the mower and upon the physical stamina of an operator.

The stray grass cutter 16, the construction of which, and the manner of its association with a conventional lawn mower, constitute the subject matter of the present invention represents, however, an improvement upon the devices heretofore developed.

This stray grass cutter comprises a carrier plate 17, which may be made of various widths for association with lawn mowers of different sizes, formed with a plurality of laterally spaced forwardly extending channels 18 in the upper face thereof, defining therebetween a plurality of ribs 19. These channels 18 and ribs 19 provide means for locating in offset relation a lower series 20 and an upper series 21 of cutter blades 22, preferably of identical construction, having V-shaped cutting portions 23 extending forwardly from the carrier plate. Preferably these cutting portions are formed with sharp outer ends 24. However, if desired they may be formed, as in the modified blade 22a shown in Fig. 7, with a slightly rounded or blunt outer end 24a. The sides 25 of the V-shaped forwardly extending portions 23, as shown, are formed with bevels 26 to provide fine cutting edges 27.

Of particular importance it is to be noted, that while the individual blades 22 of the upper and lower series 21 and 20 are of preferably identical construction they are so placed on the carrier plate that the bevels of the cutting edges of the blades in the upper series are opposed to those in the lower series. It is likewise to be noted that the ribs 19 are of a width less than that of the channels so that when the upper series 21 is placed in position marginal portions of the individual blades 22 therein will slightly overlap the next adjacent blades in the lower series.

With this construction a series of forwardly facing V-shaped cutting wedges 28 are provided with the apexes 29 thereof defined by the points where the beveled cutting edges 27 of the blades 22 in the upper and lower series 21 and 20 cross and engage to wedge cut the grass in advance of the rotary cutter 13.

As shown in Figs. 2 and 3 the channels 18 may be formed with plain or straight bottoms 30, the respective blades in the lower series 20 being secured thereto by screws 31 and the respective cutting blades in the upper series 21 being secured to the ribs 19 or upon the faces of the lower series of cutters by like screws.

In order, however, that the cutting edges of the respective blades on the upper and lower series 21 and 20 may cooperate to cut the grass in a particularly efficient manner a modified carrier plate 32 may be utilized as shown in Figs. 4 and 5 in which the channels 33 may be formed with curved bottoms 34 so as to curve the blades in the lower series 20 upwardly to engage the blades in the upper series in very tight contact at the apexes 29 of the cutting wedges 28. This especially tight contact thus tends to minimize the possibility of grass or other material jamming or being otherwise caught between the blades and improves the cutting action.

Whether the carrier plate 17 of Figs. 2 and 3 or the modified plate 32 of Figs. 4 and 5 be used it is to be noted that the screw holes 35 for all of the blades 22 are arranged in a straight line. Thus, any blade 22 may be used interchangeably in either the upper series 21 or the lower series 20 by merely properly positioning the same on a rib 19 or in a channel 18, as the case may be, and inserting a screw 31 through a hole 36 in the cutter blade and into the hole 35 in the carrier plate.

To insure a rigid association of the cutter blades 22 with the carrier plate 17, each of the blades 22 is preferably provided with a tongue portion 47 at the rear end thereof, and preferably centrally positioned as shown, which extends at a right angle to the main portion of the blade. As seen most clearly in Fig. 8 the blades in the lower series 20 are placed in such a way that the tongues 47 extend upwardly and the blades in the upper series 27 are placed so that the tongue extends downwardly.

With this construction the tongues on the blades in the upper series overlap the rear of the plate 17 and at their sides abut the upstanding tongues of adjacent blades of the lower series to thereby insure against lateral movement of the blades.

In practice it has been found that the stray grass cutter, to function most efficiently, must be positioned so that the cutting blades 22 are inclined or tilted upwardly relative to the ground; and further, that for cutting materials of different kinds the degree of inclination should be varied. The reason for this is that with the blades inclined the grass is effectively caught in the cutting wedges 28 and severed, whereas if the blades are maintained in a position parallel to the ground there is a tendency for the stray grass cutter to flatten the grass rather than wedge cut it.

To mount the stray grass cutter on the lawn mower 11 to achieve these desired results a pair of spaced coupling lugs 37, only one being shown, are provided at the rear of the plate 17 and preferably integral therewith. Each of these lugs 37 is formed with teeth 38 adapted to engage with teeth 39 formed on a mating coupling lug 40 of a supporting finger or clamp bar 41 which, as shown, may be advantageously clamped on the crossbar 15 of the lawn mower by a strap 42, preferably of spring steel, and screws 43.

A bolt 44 and thumb nut 45 serve to maintain the mating coupling lugs 37 and 40 in any desired relative position so that the inclination of the cutter blades 22 may be varied to be placed in the proper position for the particular material being cut.

To vary the height of the cutter blades it is merely necessary to pivot the clamp bars 41, there being one for each of the coupling lugs, on the crossbar 15 to thus raise and lower the entire stray grass cutter unit. Such variation of the height of the blades is advantageous in that while generally it is desirable that the fixed cutter 16 cut only the portions of the tall grass and the like which extend upwardly beyond the normal lawn growth and thus prepare the lawn for the rotary cutter 13, it is also desirable in many instances to adjust the fixed cutter 16 very close to the ground to wedge cut low lying weeds and the like which would not be trimmed by the rotary cutter.

With the stray grass cutter provided by the present invention it is to be particularly noted that while it embodies no moving parts, a highly efficient wedge cutting action is achieved. If one or more of the cutting blades 22 should be broken in use, replacement would be a simple manner, and because of the interchangeable nature of the individual blades the cost of the blades would be relatively small.

When a lawn mower with the novel stray grass cutter 16 associated therewith is moved over a lawn the grass or other growth is first engaged and cut in the wedges between adjacent upper and lower blades, the taller grass being reduced to a height which may be effectively cut by the rotary cutter 13 and the grass and stems which would normally be flattened by a conventional lawn mower being caught in the cutting wedges and severed. In this manner, in a single operation the lawn is completely trimmed without the necessity of again carefully going over the same with special clippers or shears to remove the growth which is normally flattened and left uncut in the passage of a conventional lawn mower. Also, because of the preliminary cutting of the grass by the stray grass cutter the tendency of the revolving cutter to become clogged with heavy material is substantially eliminated.

Variations and modifications may be made within the scope of this invention and portions of the improvements may be used without others.

Having thus described the invention, what is claimed as new is:

1. An auxiliary cutting device adapted to be associated with a lawn mower having a rotary cutter, including a stray grass cutter having relatively offset upper and lower cutting elements normally fixed and stationary relative to each other, providing a series of V-shaped cutting wedges; and means for supporting said stray grass cutter on said lawn mower and in advance of said rotary cutter.

2. An auxiliary cutting device adapted to be associated with a lawn mower having a rotary cutter, including a plurality of relatively offset upper and lower cutting elements normally fixed and stationary relative to each other, providing a series of V-shaped cutting wedges; means for supporting said fixed cutting elements on said lawn mower and in advance of said rotary cutter; and means associated with said supporting means for maintaining said normally fixed and stationary cutting elements in divers positions relative to the lawn mower and the lawn to be cut.

3. An auxiliary cutting device adapted to be associated with a lawn mower having a rotary cutter, including a stray grass cutter having normally fixed and stationary cutting edges; supporting means for mounting said stray grass cutter on said lawn mower to extend in advance of said rotary cutter; and means associated with said supporting means for maintaining said cutting edges in divers selected inclinations relative to the lawn to be cut.

4. An auxiliary cutting device adapted to be associated with a lawn mower having a rotary cutter, including a stray grass cutter having normally fixed and stationary cutting edges; supporting means for mounting said stray grass cutter on said lawn mower to extend in advance of said rotary cutter; means associated with said supporting means for maintaining said cutting edges in divers selected inclinations relative to the lawn to be cut; and means enabling the raising and lowering of the stray grass cutter relative to the rotary cutter.

5. An auxiliary cutting device adapted to be associated with a lawn mower having a rotary cutter, including a stray grass cutter having normally fixed and stationary cutting edges; supporting means for mounting said stray grass cutter on said lawn mower to extend in advance of said rotary cutter; and mating coupling lugs in said supporting means for enabling adjustment of said cutting edges in divers selected inclinations relative to the lawn to be cut.

6. An auxiliary cutting device adapted to be associated with a lawn mower having a rotary cutter and carrying a crossbar, including a stray grass cutter having cutting edges; a coupling lug on said stray grass cutter; clamping means secured to said crossbar and having a coupling lug; and means for connecting said coupling lugs to enable the suporting of said stray grass cutter and cutting edges in divers selected inclinations relative to the lawn to be cut.

7. An auxiliary cutting device adapted to be associated with a lawn mower having a rotary cutter and carrying a crossbar, including a stray grass cutter having cutting edges; a finger for supporting the stray grass cutter in advance of the rotary cutter; a pivotal connection between the finger and the crossbar; and a pivotal coupling between the finger and the stray grass cutter, said pivotal connection and said pivotal coupling respectively enabling adjustment of said stray grass cutter at divers heights and divers inclinations relative to the lawn to be cut.

8. An auxiliary cutting device adapted to be associated with a lawn mower having a rotary cutter, including a carrier plate having a plurality of laterally spaced forwardly extending channels and ribs; means for supporting said carrier plate on said lawn mower and in advance of said rotary cutter; lower and upper cutter blades positioned respectively in said channels and on said ribs, having V-shaped cutting portions formed with cutting edges extending forwardly from said carrier plate; means for securing said cutter blades in said channels and on said ribs; and margins on said upper blades slightly overlapping adjacent lower blades to provide a series of cutting wedges with the apexes thereof respectively defined by the points where the cutting edges of the upper blades cross the cutting edges of adjacent lower blades.

9. An auxiliary cutting device adapted to be associated with a lawn mower having a rotary cutter, including a carrier plate having a plurality of laterally spaced forwardly extending channels and ribs; means for supporting said carrier plate on said lawn mower and in advance of said rotary cutter; lower and upper cutter blades positioned respectively in said channels and on said ribs, having V-shaped cutting portions formed with cutting edges extending forwardly from said carrier plate; means for securing said cutter blades in said channels and on said ribs; margins on said upper blades slightly overlapping adjacent lower blades to provide a series of cutting wedges with the apexes thereof respectively defined by the points where the cutting edges of the upper blades cross the cutting edges of adjacent lower blades; and curved bottoms in said channels to curve said lower blades upwardly to engage said upper blades in tight contact at the apexes of said cutting wedges.

10. An auxiliary cutting device adapted to be associated with a lawn mower having a rotary cutter, including a carrier plate having a plurality of laterally spaced forwardly extending channels and ribs; means for supporting said carrier plate on said lawn mower and in advance of said rotary cutter; lower and upper cutter blades positioned respectively in said channels and on said ribs, having V-shaped cutting portions formed with cutting edges extending forwardly from said carrier plates; means for securing said cutter blades in said channels and on said ribs; margins on said upper blades slightly overlapping adjacent lower blades to provide a series of cutting wedges with the apexes thereof respectively defined by the points where the cutting edges of the upper blades cross the cutting edges of adjacent lower blades, said forwardly extending portions of the upper and lower blades being respectively angularly disposed relatively to each other to engage in tight contact at the apexes of the cutting wedges.

11. An auxiliary cutting device adapted to be associated with a lawn mower having a rotary cutter, including a carrier plate having a plurality of laterally spaced forwardly extending channels and ribs; means for supporting said carrier plate on said lawn mower and in advance of said rotary cutter; lower and upper cutter blades positioned respectively in said channels and on said ribs, provided with holes adapted to align with the holes in the carrier plate whereby the blades may be interchangeable in said channels and on said ribs; V-shaped cutting portions formed with cutting edges extending forwardly from said carrier plate; fastening elements insertable in said aligned holes to secure said cutter blades to the carrier plate; and margins on said upper blades slightly overlapping adjacent lower blades to provide a series of cutting wedges with the apexes thereof respectively defined by the points where the cutting edges of the upper blades cross the cutting edges of adjacent lower blades.

12. An auxiliary cutting device adapted to be associated with a lawn mower having a rotary cutter, including a stray grass cutter having an upper series and a lower series of forwardly extending, V-shaped cutting portions formed respectively with cutting edges of opposed bevel, said upper and lower series of cutting portions being fixed and stationary relative to each other and said forwardly extending portions in one series being offset relative to and having marginal portions slightly overlapping adjacent forwardly extending portions in the other series to provide cutting wedges with the apexes thereof respectively defined by the points where the cutting edges in one series cross the cutting edges in the other series; and means for supporting said fixed cutting portions on said lawn mower in advance of said rotary cutter.

13. An auxiliary cutting device adapted to be associated with a lawn mower having a rotary cutter, including an upper and a lower series of forwardly extending, V-shaped cutting portions formed with cutting edges, said upper and lower series of cutting portions being fixed and stationary relative to each other and said forwardly extending portions in one series being offset relative to and having marginal portions slightly overlapping adjacent forwardly extending portions in the other series to provide cutting wedges with the apexes thereof respectively defined by the points where the cutting edges in one series cross the cutting edges in the other series; and means for supporting said fixed cutting portions on said lawn mower in advance of said rotary cutter.

14. An auxiliary cutting device adapted to be associated with a lawn mower having a rotary cutter, including a stray grass cutter having an upper series and a lower series of forwardly extending, fixed and V-shaped cutting portions formed respectively with cutting edges of opposed bevel, said forwardly extending portions in one series being offset relative to and having marginal portions slightly overlapping adjacent forwardly extending portions in the other series to provide cutting wedges with the apexes thereof respectively defined by the points where the cutting edges in one series cross the cutting edges in the other series, and said forwardly extending portions in said upper and lower series being respectively angularly disposed relatively to each other to engage in tight contact at the apexes of the cutting wedges; and means for supporting said fixed cutting portions on said lawn mower in advance of said rotary cutter.

15. An auxiliary cutting device adapted to be associated with a lawn mower having a rotary cutter, including a carrier plate having a plurality of laterally spaced forwardly extending channels and ribs; lower and upper cutting blades positioned respectively in said channels and on said ribs, having substantially V-shaped cutting portions formed with cutting edges extending forwardly from said carrier plate; means for securing said cutter blades in said channels and on said ribs; margins on said upper blades slightly overlapping adjacent lower blades to provide a series of cutting wedges with the apexes thereof respectively defined by the points where the cutting edges of the upper blades cross the cutting edges of adjacent lower blades; supporting means for mounting said carrier plate on said lawn mower and in advance of said rotary cutter; and means associated with said supporting means for maintaining said carrier plate and cutter blades at divers angles of inclination.

FREDERICK W. BARKER.
LESTER C. BARKER.